(12) United States Patent
Sacco et al.

(10) Patent No.: US 11,884,028 B2
(45) Date of Patent: Jan. 30, 2024

(54) 3D PRINTED WATER COOLED TOW GUIDE FOR FIBER PLACEMENT MACHINE

(71) Applicant: University of South Carolina, Columbia, SC (US)

(72) Inventors: Christopher Sacco, Columbia, SC (US); Andrew Anderson, Columbia, SC (US)

(73) Assignee: University of South Carolina, Columbia, SC (US)

( * ) Notice: Subject to any disclaimer, the term of this patent is extended or adjusted under 35 U.S.C. 154(b) by 0 days.

(21) Appl. No.: 17/386,790

(22) Filed: Jul. 28, 2021

(65) Prior Publication Data

US 2022/0032560 A1    Feb. 3, 2022

Related U.S. Application Data

(60) Provisional application No. 63/057,386, filed on Jul. 28, 2020.

(51) Int. Cl.
*B29C 70/38* (2006.01)
(52) U.S. Cl.
CPC .................. *B29C 70/384* (2013.01)

(58) Field of Classification Search
CPC ...... B29C 70/38; B29C 70/382; B29C 70/384; B29C 70/386; B29C 70/388; B29C 70/545

See application file for complete search history.

(56) References Cited

U.S. PATENT DOCUMENTS

| | | | | |
|---|---|---|---|---|
| 5,979,531 | A * | 11/1999 | Barr | B29C 70/384 156/499 |
| 2006/0070697 | A1* | 4/2006 | Hoffmann | B29C 70/382 156/441 |
| 2012/0222810 | A1* | 9/2012 | Vaniglia | B29C 70/384 156/499 |
| 2018/0104863 | A1* | 4/2018 | Cottrell | B29C 33/04 |

* cited by examiner

*Primary Examiner* — George R Koch
(74) *Attorney, Agent, or Firm* — Burr & Forman LLP; Douglas L. Lineberry (57) ABSTRACT

A solution for fiber placement tow guides, known as "scoops," to be cooled that allows for increased heating of outgoing tows while having cooling channels within the scoop to avoid melting, layup of thermoplastic materials will often see material temperatures of over 800° Fahrenheit, which means the heat shield will be heated to even higher temperatures that distorts existing scoops to a degree where they cause unwanted layup quality or may even melt certain scoops.

17 Claims, 11 Drawing Sheets

3D PRINTED WATER COOLED TOW GUIDE FOR FIBER PLACEMENT MACHINE

TECHNICAL FIELD

The subject matter disclosed herein is generally directed to a solution for high temperature fiber placement tow guides, known as "scoops," to be gas or fluid cooled that allows for increased heating of outgoing tows while having cooling channels within the scoop to avoid melting as layup of thermoplastic materials will often see material temperatures of over 800° Fahrenheit, which means the heat shield will be heated to even higher temperatures. This will distort normal scoops to a degree where they cause unwanted layup quality or may even melt certain scoops.

BACKGROUND

Automated Fiber Placement (AFP) is an additive manufacturing process mostly utilized in the aerospace industry. This process uses very large robots to heat and place (layup) tows (thin strips) of carbon fiber onto a mold to make various fiber-reinforced composite components. This technology is being utilized at an increasing rate to construct major components in air and space craft. Therefore, to keep up with the demand, solutions to create higher production rates with lower costs must be found. This demand can potentially be fulfilled with a thermoplastic carbon fiber composite polyetheretherketone (PEEK) material. PEEK material requires much higher temperatures than traditional thermoset prepregs and thus modern heating technologies such as laser and flashlamp are needed. The temperatures needed for layup are in excess of 450° C. Such high temperatures require extensive cooling for components of the AFP Fiber Deposition Module (FDM).

A scoop is a device that guides material being placed onto a mold by an Automated Fiber Placement machine. This guide also acts as a heat shield for the material. Layup of thermoplastic materials will often see material temperatures of over 800° Fahrenheit, which means the heat shield will be heated to even higher temperatures. This will distort normal scoops to a degree where they cause unwanted layup quality or may even melt certain scoops.

AFP has become a key manufacturing technique for the production of large composite structures. The adoption of composite materials in the aerospace industry, particularly with the development of composite airframes such as the Boeing 787 and Airbus A350, has driven the need to greatly improve the manufacturing process for composites. AFP utilizes robotic placement to create an additive manufacturing process that is faster and more consistent than hand-layup.

One area that many researchers and Original Equipment Manufacturers (OEM) have placed a high priority on improving is the range of materials that AFP can process. Typically, AFP manufactures with materials that have a thermosetting resin. Thus, cure time in an autoclave is usually required as an end step in the manufacturing process to harden and set the part shape. The autoclave cure cycle represents a significant bottleneck in throughput in addition to incurring high equipment costs. Moving from thermosetting materials to thermoplastics appears to be a solution to this issue. Current AFP techniques and equipment are undergoing a shift to better withstand the increased requirements for the processing of thermoplastic material. This is especially apparent in an exploration of the processing temperatures required to use AFP with many of the thermoplastics under consideration in the aerospace field.

The thermoplastic matrix materials under consideration by the aerospace industry require extremely high processing temperatures, necessitating the need to develop machine components that are capable of withstanding these new processing temperatures. Accordingly, it is an object of the present disclosure to provide a water cooled scoop that allows for heat to reach the tows, acting in reverse of a heat shield. The scoop is also water cooled to avoid over heating or melting. The scoop may be used for AFP and employ active cooling. It may also leverage laser powder bed fusion additive manufacturing. The scoop was designed to be more resilient to high temperature environments and capable of quickly dissipating heat during laydown.

Citation or identification of any document in this application is not an admission that such a document is available as prior art to the present disclosure.

SUMMARY

The above objectives are accomplished according to the present disclosure by providing in one embodiment, an improved automated fiber placement scoop. The scoop may include a scoop with a scoop body that has at least one fin positioned on a distal end of the scoop body and an internal cavity with a porous internal support structure shaped to allow gas and/or liquid to flow within the scoop body. Further, the scoop outer surface may have contouring. Still yet, the scoop may include at least one vent opening. Yet again, a gas and/or liquid may enter the internal cavity via the at least one vent opening. Furthermore, the scoop may include a second vent opening. Again, the gas and/or liquid may leave the internal cavity via the second vent opening. Further yet, the scoop may include a plurality of fins spaced apart and substantially parallel to one another along the distal end of the scoop body. Again yet, the fins may be spaced along the distal end of the scoop body so that opposing edges of a tow passing under the scoop are not covered by a fin or other portion of the scoop. Moreover, the flow of the gas and/or liquid into the internal cavity may be adjusted to maintain a prescribed temperature for the scoop. Indeed, the scoop may be additively manufactured.

In a further embodiment, the current disclosure provides an improved method for tow placement during an automated fiber placement process. The method may include incorporating a scoop into an automated fiber placement device and employing the scoop to place at least one tow as part of the process and the scoop includes a scoop body that has at least one fin positioned on a distal end of the scoop body, as well as introducing a gas and/or liquid flow into an internal cavity of the scoop body that has a porous internal support structure shaped to allow the gas and/or liquid to flow within the internal cavity. Further, the scoop may be curved to engage with a roller of the automated fiber placement process. Again, the scoop may comprise outer surface contouring. Further, the scoop may include at least one vent opening. Yet still, the gas and/or liquid may enter the internal cavity via the at least one vent opening. Yet again, the scoop may have a second vent opening. Indeed, the method may include influencing the gas and/or liquid to leave the internal cavity via the second vent opening. Yet further, the scoop may include a plurality of fins spaced apart and substantially parallel to one another along the distal end of the scoop body. Furthermore, the method includes spacing the fins along the distal end of the scoop body so that opposing edges of a tow passing under the scoop are left uncovered by a fin or other portion of the scoop. Yet still, the method may include adjusting a flow of the gas and/or liquid into the internal cavity to maintain a prescribed temperature for the scoop.

These and other aspects, objects, features, and advantages of the example embodiments will become apparent to those having ordinary skill in the art upon consideration of the following detailed description of example embodiments.

BRIEF DESCRIPTION OF THE DRAWINGS

An understanding of the features and advantages of the present disclosure will be obtained by reference to the following detailed description that sets forth illustrative embodiments, in which the principles of the disclosure may be utilized, and the accompanying drawings of which.

The figures herein are for illustrative purposes only and are not necessarily drawn to scale.

DETAILED DESCRIPTION OF A PREFERRED EMBODIMENT

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting.

Unless specifically stated, terms and phrases used in this document, and variations thereof, unless otherwise expressly stated, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are cited to disclose and describe the methods and/or materials in connection with which the publications are cited. All such publications and patents are herein incorporated by references as if each individual publication or patent were specifically and individually indicated to be incorporated by reference. Such incorporation by reference is expressly limited to the methods and/or materials described in the cited publications and patents and does not extend to any lexicographical definitions from the cited publications and patents. Any lexicographical definition in the publications and patents cited that is not also expressly repeated in the instant application should not be treated as such and should not be read as defining any terms appearing in the accompanying claims. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Where a range is expressed, a further embodiment includes from the one particular value and/or to the other particular value. The recitation of numerical ranges by endpoints includes all numbers and fractions subsumed within the respective ranges, as well as the recited endpoints. Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure. For example, where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', 'less than y', and 'less than z'. Likewise, the phrase 'about x, y, z, or greater' should be interpreted to include the specific ranges of 'about x', 'about y', and 'about z' as well as the ranges of 'greater than x', 'greater than y', and 'greater than z'. In addition, the phrase "about 'x' to 'y'", where 'x' and 'y' are numerical values, includes "about 'x' to about 'y'".

It should be noted that ratios, concentrations, amounts, and other numerical data can be expressed herein in a range format. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about," it will be understood that the particular value forms a further aspect. For example, if the value "about 10" is disclosed, then "10" is also disclosed.

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

As used herein, the singular forms "a", "an", and "the" include both singular and plural referents unless the context clearly dictates otherwise.

As used herein, "about," "approximately," "substantially," and the like, when used in connection with a measurable variable such as a parameter, an amount, a temporal duration, and the like, are meant to encompass variations of and from the specified value including those within experimental error (which can be determined by e.g. given data set, art accepted standard, and/or with e.g. a given confidence interval (e.g. 90%, 95%, or more confidence interval from the mean), such as variations of +/−10% or less, +/−5% or less, +/−1% or less, and +/−0.1% or less of and from the specified value, insofar such variations are appropriate to perform in the disclosure. As used herein, the terms "about," "approximate," "at or about," and "substantially" can mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

The term "optional" or "optionally" means that the subsequent described event, circumstance or substituent may or may not occur, and that the description includes instances where the event or circumstance occurs and instances where it does not.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s). Reference throughout this specification to "one embodiment", "an embodiment," "an example embodiment," means that a particular feature, structure or characteristic described in connection with the embodiment is included in at least one embodiment of the present disclosure. Thus, appearances of the phrases "in one embodiment," "in an embodiment," or "an example embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the disclosure. For example, in the appended claims, any of the claimed embodiments can be used in any combination.

All patents, patent applications, published applications, and publications, databases, websites and other published materials cited herein are hereby incorporated by reference to the same extent as though each individual publication, published patent document, or patent application was specifically and individually indicated as being incorporated by reference.

This current disclosure intends to solve a problem related to Automated Fiber Placement (AFP) with thermoplastic tape materials. Presently, AFP with thermoplastics such as PEEK, PAEK, require use of high power laser heating systems. The temperature required to heat this material enough to manufacture ranges from 700-800 degrees Fahrenheit. This temperature is too high for standard tow guides (scoops), and thus the heat must be concentrated to a small area known as the "nip point."

This disclosure circumvents the issue of heat issues by providing an improved scoop that may be fluid or gas cooled. This will allow for other, potentially more intense, heating systems to be used, such as the Heraeus humm3®, available from Heraeus Holding GmbH, Postfach 1561, D-63405 Hanau, Germany. This will also allow for faster layup speeds, as a portion of the tows can be heated for a longer duration. Thus, this disclosure will allow for higher production rates of thermoplastic material for AFP due to its design by allowing more heat to reach the material for a longer duration.

The AFP scoop serves two functions: (1) to act as a heat shield for outgoing tows as to not overheat the material; and (2) to act as a guide to initiate placement of tows onto a mold in a desired fashion. Due to the nature of thermoplastic materials, a very high energy density is needed to heat the material to a high enough temperature for layup. Presently, only laser heating systems are able to accommodate such heating demands at high layup speeds. The cooled scoop of the current disclosure seeks to bridge the gap between laser and non-laser heating systems for AFP. This will allow for extreme heat levels to encounter the scoop without fear of metal deformation and excess heat transfer to other components of the AFP process.

Figure 8:
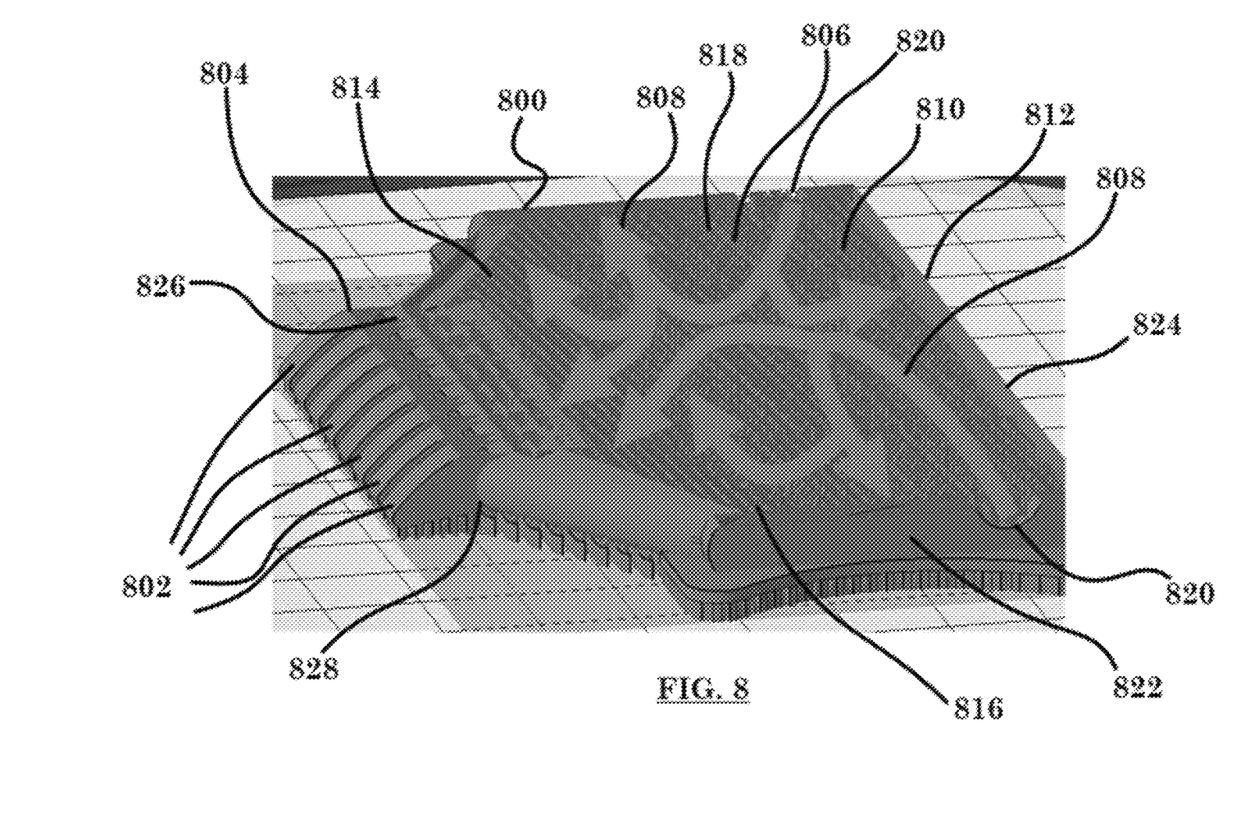
FIG. 8 shows a cut-away view of a scoop of the current disclosure.

The scoop features fins that may be designed with a variety of widths to comport to various AFP conditions. Indeed, while fins of the current disclosure may be shown uniformly shaped, the fins may be disparately shaped and sized with respect to one another to improve heat dissipation and/or accommodate a unique AFP machinery set-up requiring specifically shaped scoops to operate or fit within the process machinery. The fins may be sized with a specific width as to cover the majority of each tow but to allow the edges to be preheated before being deposited onto a mold, such as by fins 802 being placed parallel or substantially parallel to one another along distal edge 828 of scoop distal end 826 to cover substantially all of the tow but to allows the tow edges, not shown, to not be covered by fins 802 or any other part of scoop 800 so that the tow edges may be heated, treated, etc. The tow edges are the most critical portion of the tow with regards to tackiness and sticking to the mold. Further, the scoop heat exchanging fluid flow rate can be adjusted to maintain a prescribed temperature for the scoop as part of the AFP. This may be by increasing or decreasing flow rate of the gas and/or liquid within the scoop to either speed up or slow down introduction of "fresh" coolant that has not been exposed to the increased temperatures experienced by the scoop or previously used coolant that has been cooled after introduction to the scoop. Indeed, ranges of temperatures may be used herein such as maintaining the scoop within the range of 200 C to 800 C, 250 C to 750 C, 300 C to 700 C, 350 C to 650 C, 400 C to 600 C, 450 C to 550 C, including subsets within these ranges, and/or maintaining the scoop at a specific temperature such as 200 C, 250 C, 300 C, 350 C, 400 C, 450 C, 500 C, 550 C, etc. as well as other specific temperature points within these values.

Figure 1:
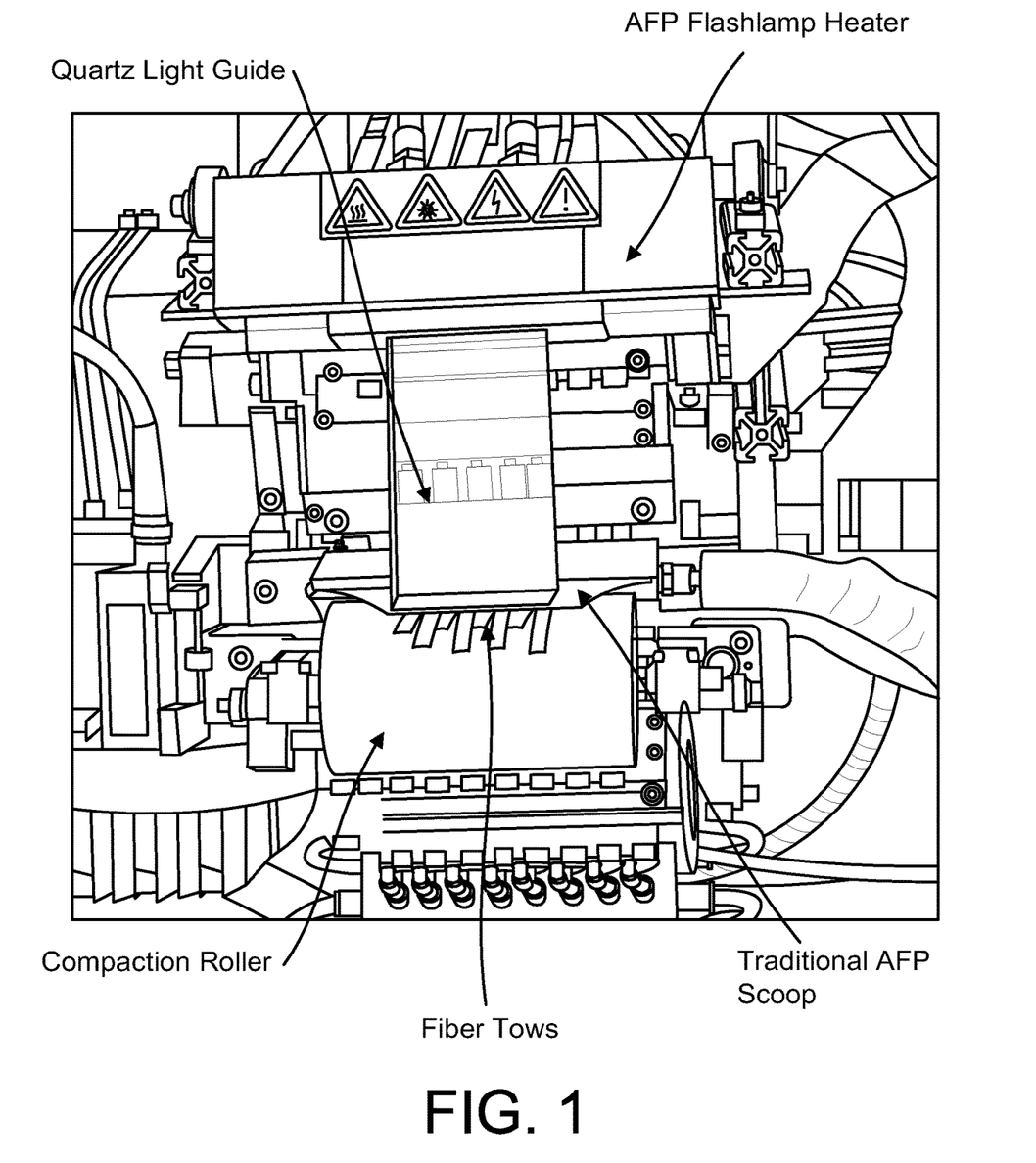
FIG. 1 shows a traditional AFP scoop assembly.
Figure 2:
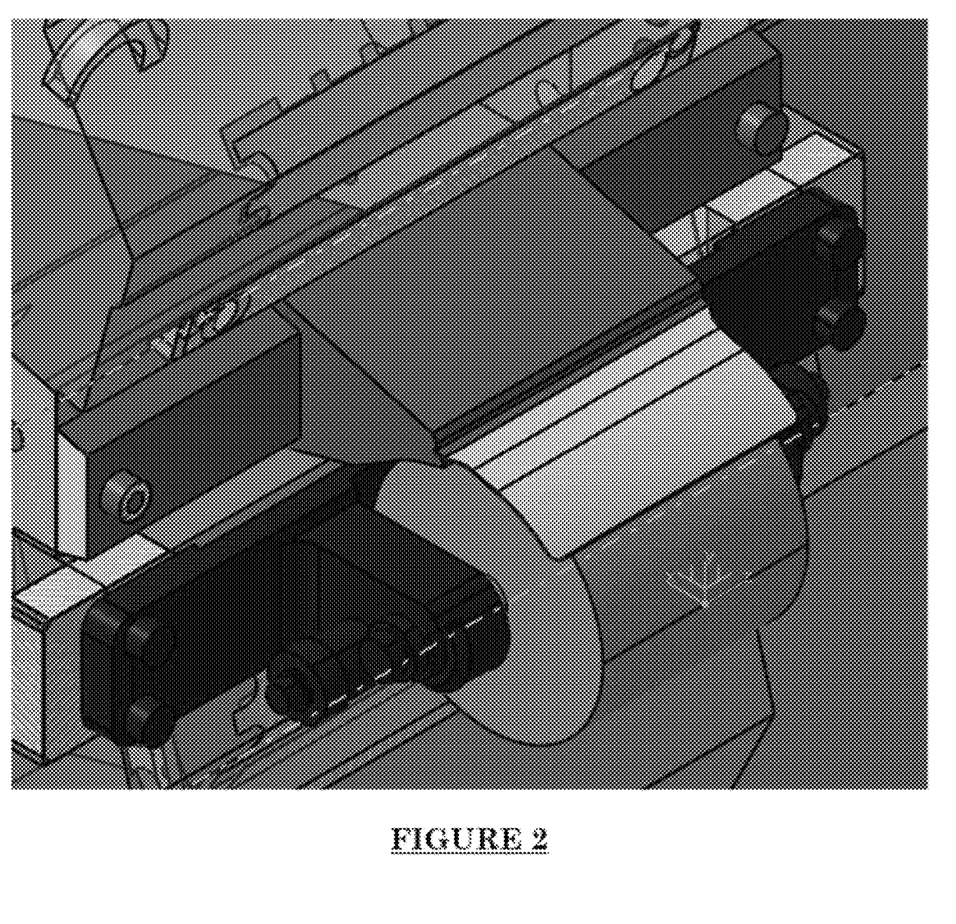
FIG. 2 shows an illustration of a traditional scoop assembly.
Figure 3:
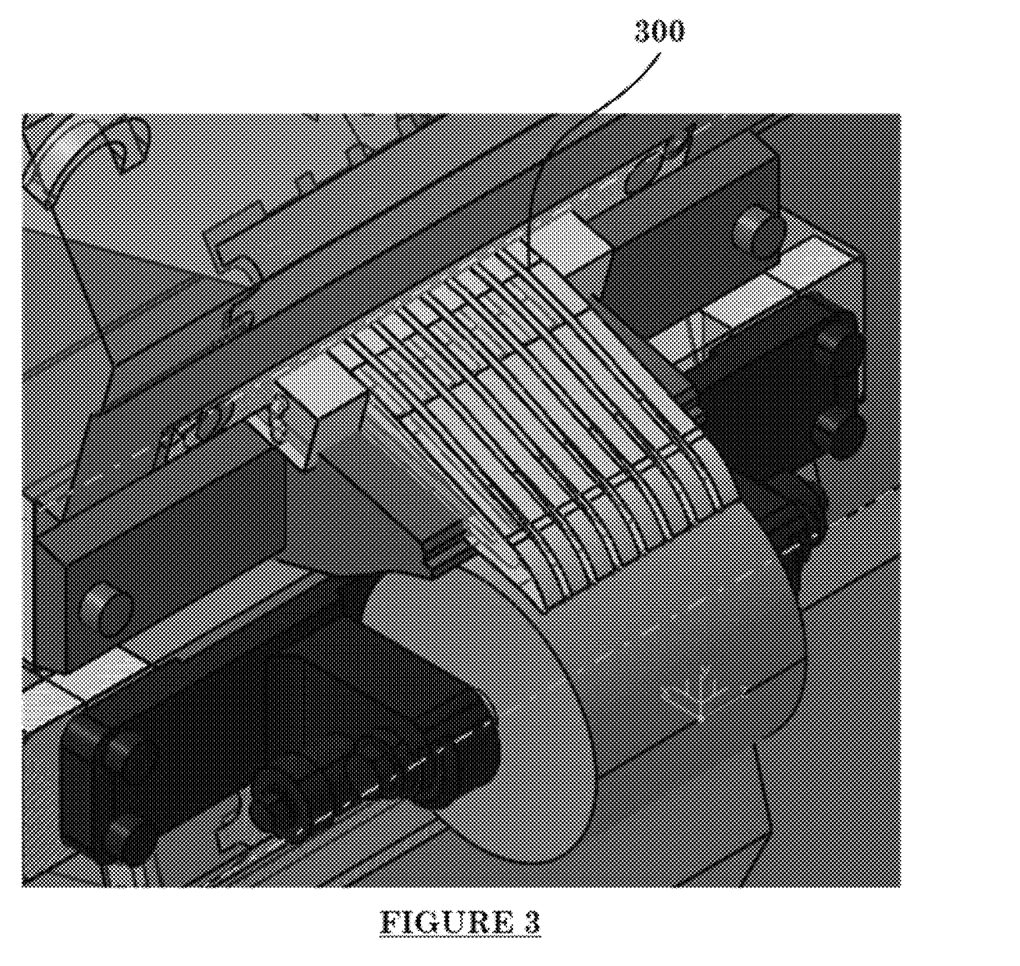
FIG. 3 shows an improved scoop of the current disclosure integrated into a production assembly.
Figure 4:
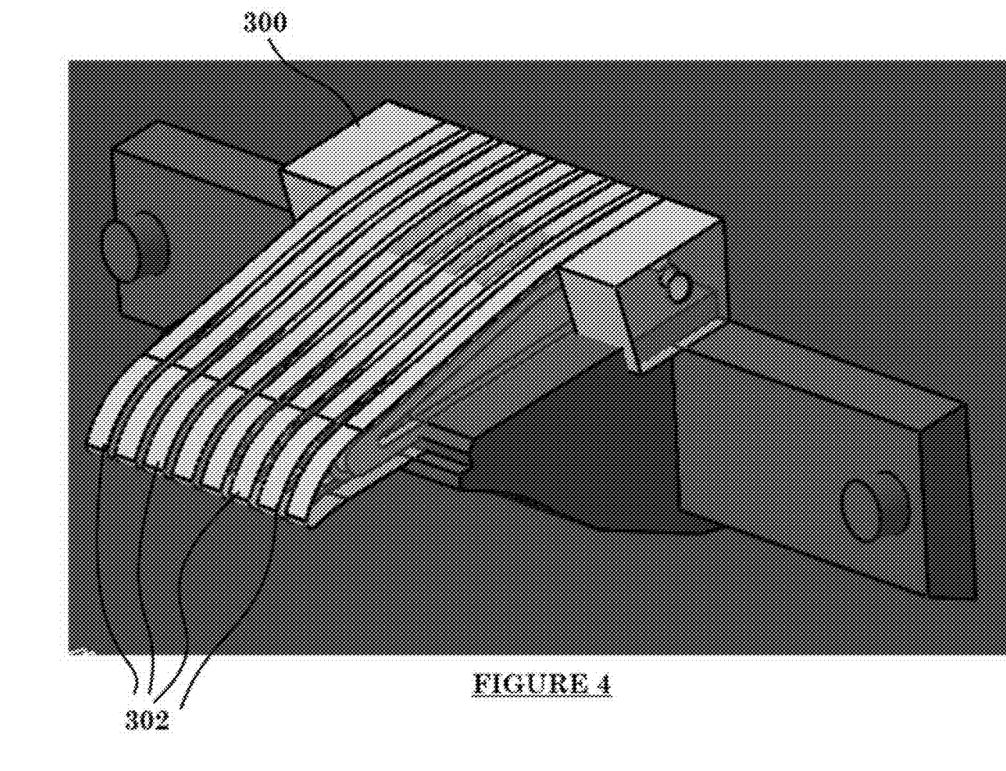
FIG. 4 shows an improved scoop removed from the production assembly.
Figure 5:
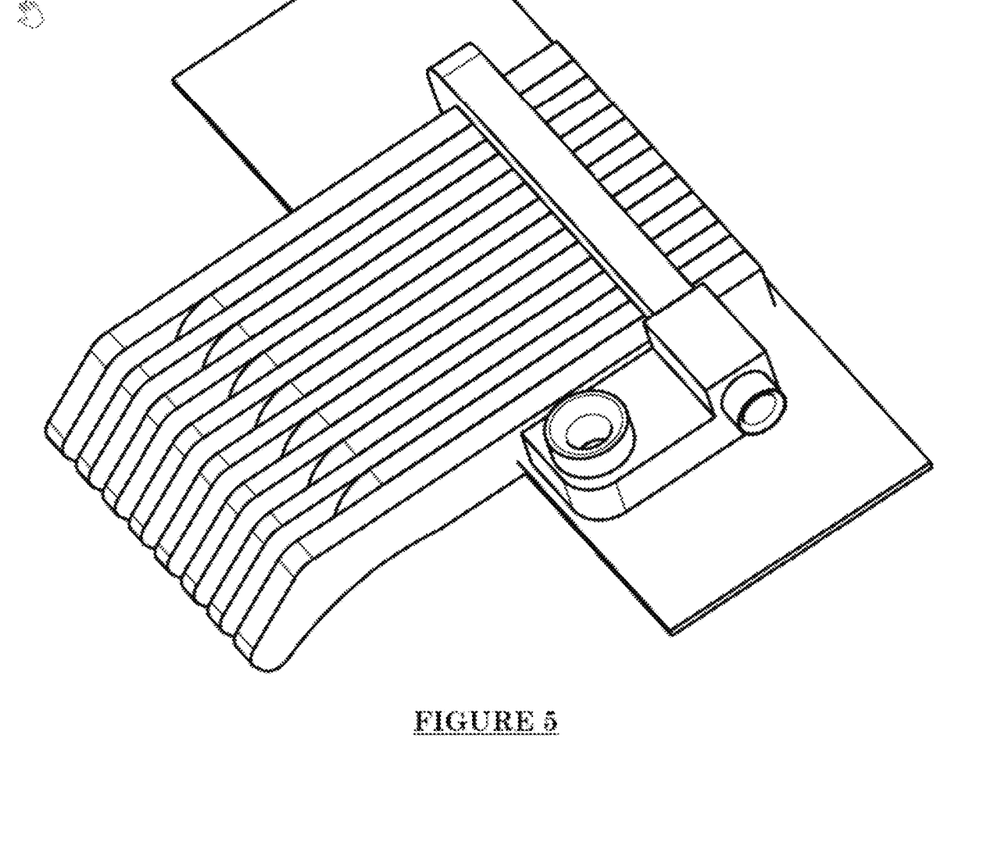
FIG. 5 shows an alternate view of an improved scoop of the present disclosure.
Figure 6:
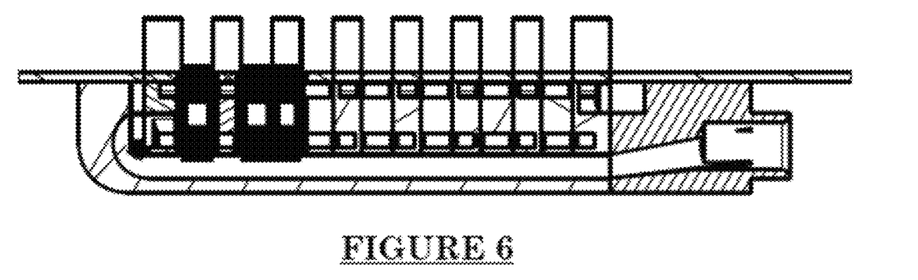
FIG. 6 shows a side view of an improved scoop of the current disclosure.

FIG. 1 shows a traditional AFP scoop assembly. FIG. 2 shows an illustration of a traditional scoop assembly. FIG. 3 shows an improved scoop 300 of the current disclosure integrated into a production assembly. FIG. 4 shows an improved scoop 300 removed from the production assembly. Improved scoop 300 includes fins 302 that aid in the cooling process. FIG. 5 shows an alternate view of an improved scoop of the present disclosure. FIG. 6 shows a side view of an improved scoop of the current disclosure.

The present disclosure seeks to provide a novel AFP machine component, known as a scoop, that is additively manufactured out of materials capable of withstanding temperatures at or above 500 C, such as nickel, stainless steel, stainless steel alloys of titanium, chromium, molybdenum, nickel-based allows of tantalum, titanium, niobium, zirconium based alloys, tungsten alloys with various cooling features such as fins and/or internal channels such that it can be actively cooled. It is the hope of this research that replacing the traditional scoop design with this new form, it may begin to allow for the exploration of even higher processing temperatures, and thus adoption of even more exotic materials for AFP.

"Additive Manufacturing," with respect to this disclosure, references technologies that grow three-dimensional objects one superfine layer at a time. Each successive layer bonds to the preceding layer of melted or partially melted material. Objects are digitally defined by computer-aided-design (CAD) software that is used to create .stl files that essentially "slice" the object into ultra-thin layers. This information guides the path of a nozzle or print head as it precisely deposits material upon the preceding layer. Alternatively, a laser or electron beam may selectively melt or partially melt in a bed of powdered material, as the material cools or is cured, it fuses together to form a three-dimensional object.

Overview of AFP and Components

The additive process of AFP places tows of material on a surface to build up a single ply. To create a complete part, plies are placed on top of one another at varying fiber angles until desired stiffness or strength properties are reached. Various layup strategies can be employed to account for variances in geometry or to minimize certain manufacturing defects.

Figure 7:
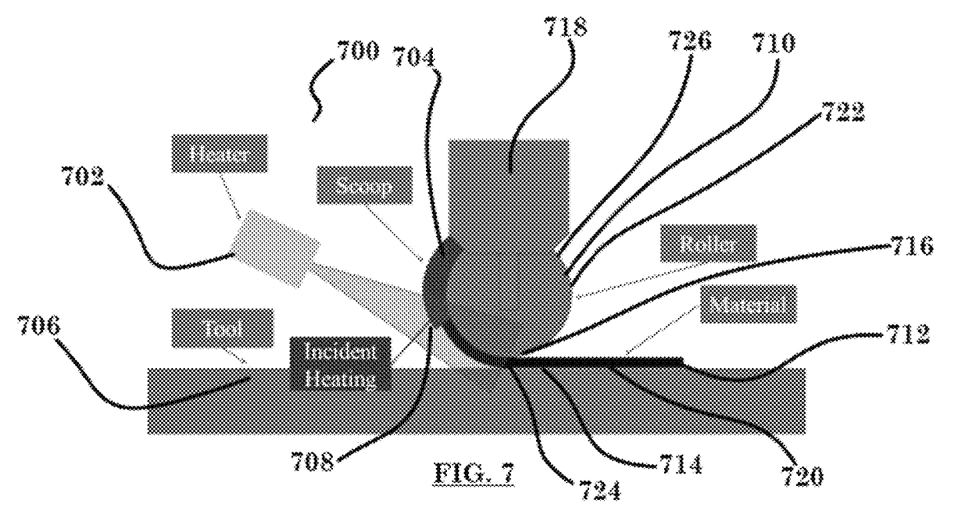
FIG. 7 shows a schematic of the components of the AFP head involved in material deposition.

FIG. 7 shows a schematic 700 of the components involved with AFP head 718 for material deposition. Schematic 700 includes heating source 702, scoop 704, tool 706, incident heating location 708, roller 710, and work material 712. To create sufficient tack for the work material 712 to stick to layup surface 714, a combination of heat, from heating source 702, and pressure, from roller 710, is applied to work material 712 at contact point 716 on AFP head 718, see FIG. 7. Heating source 702 may be an infrared heater, see K. Xia, R. Harik, J. Herrera, J. Patel, and B. Grimsley, "Numerical simulation of AFP nip point temperature prediction for complex geometries," in *SAMPE* 2018 *Conference & Exhibition*, Long Beach, California, US, 21-24 May 2018, 2018, but moving to more exotic heating sources such as laser heaters, see O. Baho, G. Ausias, Y. Grohens, and J. Férec, "Simulation of laser heating distribution for a thermoplastic composite: effects of AFP head parameters," *Int. J. Adv. Manuf. Technol.*, Vol. 110, no. 7-8, pp. 2105-2117, 2020, and the Heraeus humm3®, available Heraeus Holding GmbH, Postfach 1561, D-63405 Hanau, Germany, system are also considered within the scope of this disclosure as may be required for processing a variety of materials for AFP processes. Generally, thermoplastic materials will have a significantly higher temperature processing window than thermosets, see J. Chen, K. Fu, and Y. Li, "Understanding processing parameter effects for carbon fibre reinforced thermoplastic composites manufactured by laser-assisted automated fibre placement (AFP)," *Compos. Part A Appl. Sci. Manuf.*, vol. 140, no. October 2020, p. 106160, 2021. A compaction mechanism, such as cylindrical roller 710, see J. Jiang, Y. He, H. Wang, and Y. Ke, "Modeling and experimental validation of compaction pressure distribution for automated fiber placement," *Compos. Struct.*, vol. 256, no. October 2020, p. 113101, 2021, takes the extruded and heated work material 712, and mates it to the layup surface 714 using the tack properties of the heated material. For thermoplastic materials, consolidation of the material must happen in-situ, implying that a complete melting of the matrix must occur for compaction to be effective.

To guide tow(s) 720 onto roller 710 in a position that is both positioned correctly and exposed to heating source 702, an appliance, denoted herein as a "scoop" 704, is positioned directly above roller 710 and curved along roller surface 722 such that, as work material 712 is fed from AFP head 718, it is curved down onto roller 710 and deposited onto tool 706. Scoop 704 is in the unenviable position of being exposed continuously throughout layup to a significant portion of the heating required to process work material 712 as it is applied.

Scoop Design

Processing windows for thermoplastics can exceed nip point 724 temperature of 500° C., see J. Chen, K. Fu, and Y. Li, "Understanding processing parameter effects for carbon fibre reinforced thermoplastic composites manufactured by laser-assisted automated fibre placement (AFP)," *Compos. Part A Appl. Sci. Manuf.*, Vol. 140, no. October 2020, p. 106160, 2021, which exceeds the service temperature of many common machine materials, including various alloys of aluminum. Therefore, scoop 704 may be manufactured from a temperature tolerant material, such as 316L Stainless Steel, such that it would be able to withstand the higher processing temperatures of the thermoplastic materials. While material selection alone aided greatly in temperature management, the continuous cycling of heat during layup still is a challenge, as thermal equilibrium was suspected to be at a considerable temperature.

FIG. 8 shows a cut-away view of a further embodiment of a scoop 800 of the current disclosure with the upper surface of scoop 800 removed from scoop body 824 to show scoop interior 810. To further the thermal properties of scoop 800, fins 802 acting as a heat sink were incorporated into the design at curve point 804, where scoop 800 curves to match curvature 726 of roller 710, see FIG. 7. An internal channel 806 was incorporated into scoop 800 inner chamber 814 such that liquids or gases, such as air or various coolant liquids, could be circulated, see arrows 808, throughout scoop interior 810 to help offset the temperature conditions experienced during use.

Internal channel 806 may be a single continuous channel or a multitude of separate channels. Further, orientation of channel 806 may be parallel to scoop proximal end 812, angled, such as from 1° to 89°, as well as ranges in between these values, with respect to scoop proximal end 812, arranged in a sinusoidal pattern within scoop inner chamber 814, run perpendicular to scoop proximal end 812, etc., as desired for maximum cooling effect. These additions are intended to considerably increase the service temperature at which scoop 800 can operate and, just as critically, increase the length of each cycle that can be manufactured, leading to an increase in the size of composite structures accessible to AFP. This can result in a functional extension of what AFP is capable of manufacturing in terms of both material and size of the component being formed. As shown, fins 802 may be formed on scoop distal end 826 and shaped to provide specific contours to scoop 800 such as giving scoop body 824 a "sloped" appearance.

Manufacturing Through Laser Powder Bed Fusion

Figure 9:
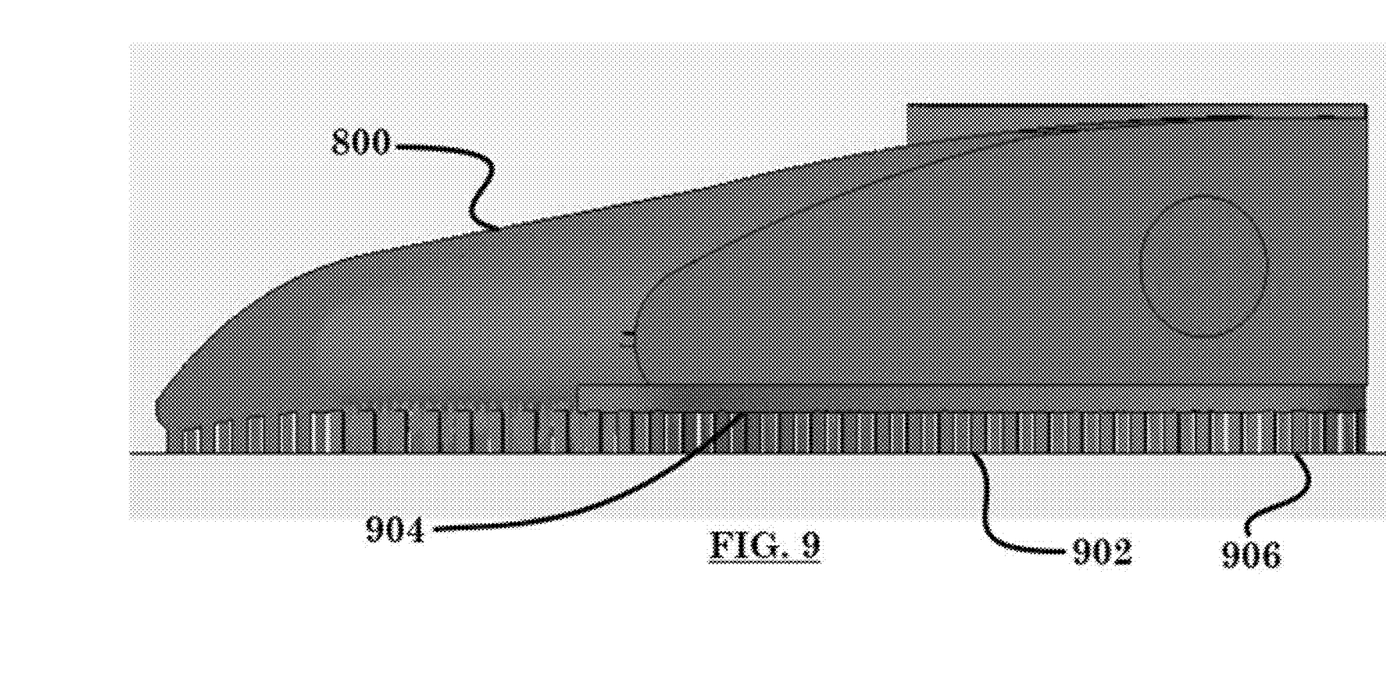
FIG. 9 shows an enlarged side view of a scoop of the current disclosure.

To manufacture complex metal parts, additive manufacturing is indispensable. A Laser Powder Bed Fusion (L-PBF) printer, available from Aconity MIDI, was utilized to manufacture scoop 800 from a suitable temperature stable material, such as 316L Stainless Steel. The high precision laser melting, and layer-by-layer fabrication, ensure fine feature resolution and the completion of the intricate scoop 800 design in one manufacturing step. In addition, minimum post-processing procedures were performed to remove the part from the build plate and improve the local surface quality. The scoop may be built horizontally to get better inner structure finishing with minimal manufacturing time. As shown in FIG. 9, which shows an enlarged view of scoop 800, a bottom surface feature pattern 902, which in one instance may be an offset or "zigzag" pattern of standing features 904, which may be shaped as columns, flanges, cones, cubes, flaps, etc., was designed and applied at bottom surface 904 of scoop 800 to facilitate the removal of the product from the build plate 906. With the design of zigzag stand-up bottom, scoop 800 may be removed from the metal base plate by a handsaw or other implement via cutting or otherwise removing standing features 904.

To support scoop inner chamber 814, a highly porous lattice support structure 816, which may take the form of continuously flowing ridges, walls, sinusoidal paths, stand-alone walls forming paths, columns, cones, etc., that create passageways 818 to "wind" through inner chamber 814 to allow gas and/or liquids passage and flow abilities therein, was selected and generated by Autodesk® Netfabb®, as shown in FIG. 8. Porous may mean that a gas and/or liquid may flow within cavities of inner chamber 814 and/or that support structure 816 may have pores, openings, tunnels, etc., defined within their structure that allow gas and/or liquid to pass freely there through. Further, vent openings 820 may be formed or defined within scoop sidewalls 822 to allow for inputting gaseous and/or liquid coolants, which may be via a pressurized input system as known to those of skill in the art, not shown, into scoop inner chamber 814 to flow through passageways 818, which may form a single, continuous internal channel 806 or separate channels, and cool scoop 800 during use. Indeed, in one embodiment, one vent may serve as an ingress vent allowing gas/fluid to flow under pressure through scoop inner chamber 814 and exit via the other vent serving as an egress vent with a continual gas and/or liquid flow constantly providing fresh coolant to scoop 800.

Forming a highly porous lattice support structure 816 not only enables the printing of a large overhang surface, but also dramatically enhances the heat diffusion efficiency by increasing inner surface area, where cooling liquid/gas may be applied during scoop operation. The print laser power may be set at 800 W and the scanning speed may be 150 mm/s to achieve a fully dense production. The layer thickness is set at approximately 30 microns and the laser diameter at approximately 80 microns for better feature resolution.

Figure 10:
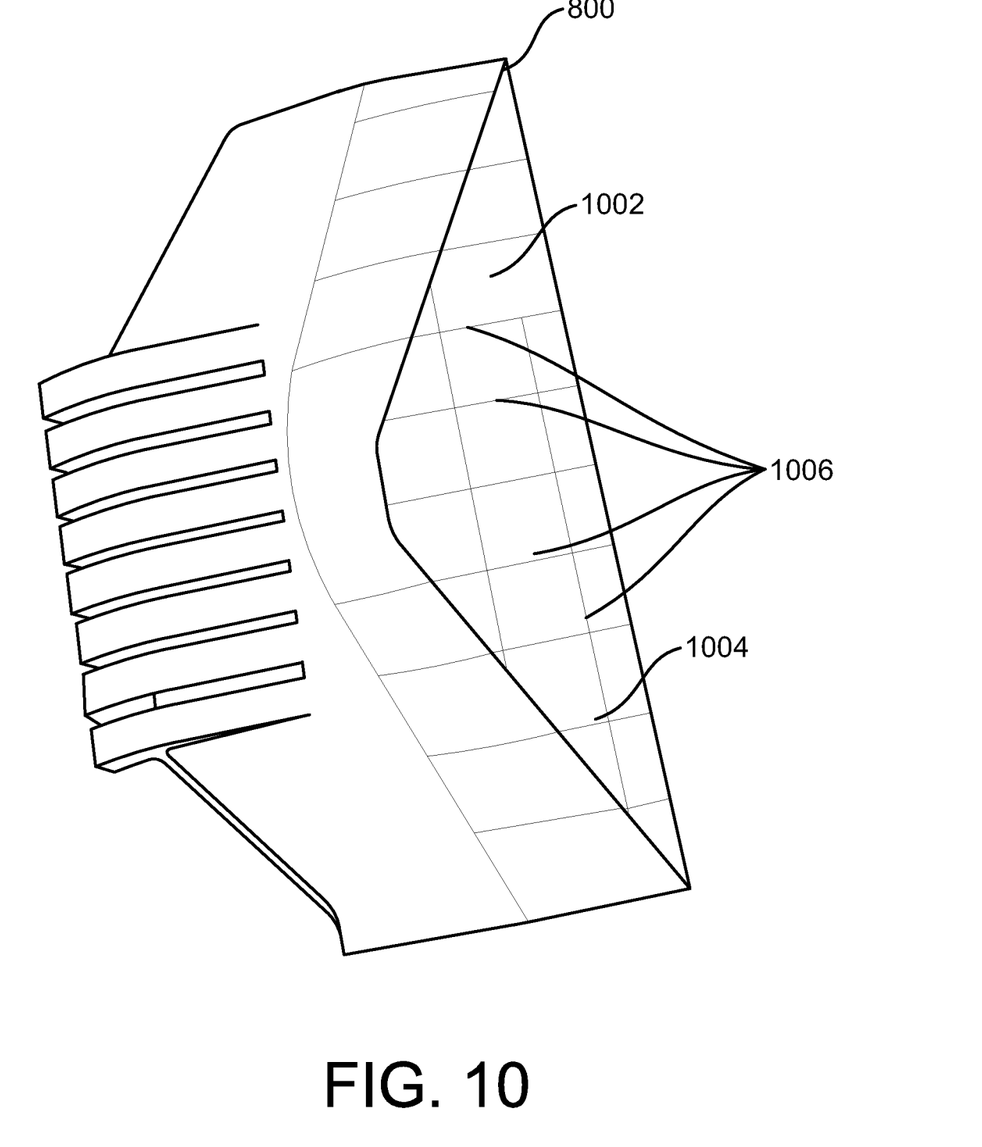
FIG. 10 shows a picture of a 3-D printed scoop of the current disclosure.

Contours and shaping may be applied to improve scoop outer surface 1002, see FIG. 10, surface quality. Various surface topographies 1004 may be formed into scoop outer surface 1002, such as a "chess board" topography 1006, that may be applied to further reduce thermal stress remaining in scoop 800 during use. Surface topography 1004 may include swirls, channels, projections, walls, designs, three dimensional shapes, etc., formed into/onto scoop outer surface 1002 to aid in cooling and/or create a preferred appearance to scoop outer surface 1002. FIG. 10 shows a photo of a 3-D printed scoop of the current disclosure showing a "chess board" surface topography 1006.

Testing and Results

To replicate layup conditions, a mounting mechanism was constructed such that the machines heating mechanism could be jogged to a scoop of the current disclosure and the heating element could be placed directly next to the scoop. The heater crystal was placed at distance of 1 inch away from the scoop. A series of 5 thermocouples were placed on the scoop, with one being placed internally before the coolant lines were attached. Air was split from the pneumatic tow cutters on the AFP machine and directed to circulate air through the scoop. A Heraeus humm3 heater was used to perform heating cycle. To simulate a layup, a cycle of 30 seconds on 5 seconds off 5 times was performed with a heater voltage of 210 W, a pulse width of 2 ms, and a frequency of 60 Hz to generate conditions for a layup of a single ply. After, an extended cool down period was allowed to monitor the heat dissipation abilities of the scoop.

Figure 11:
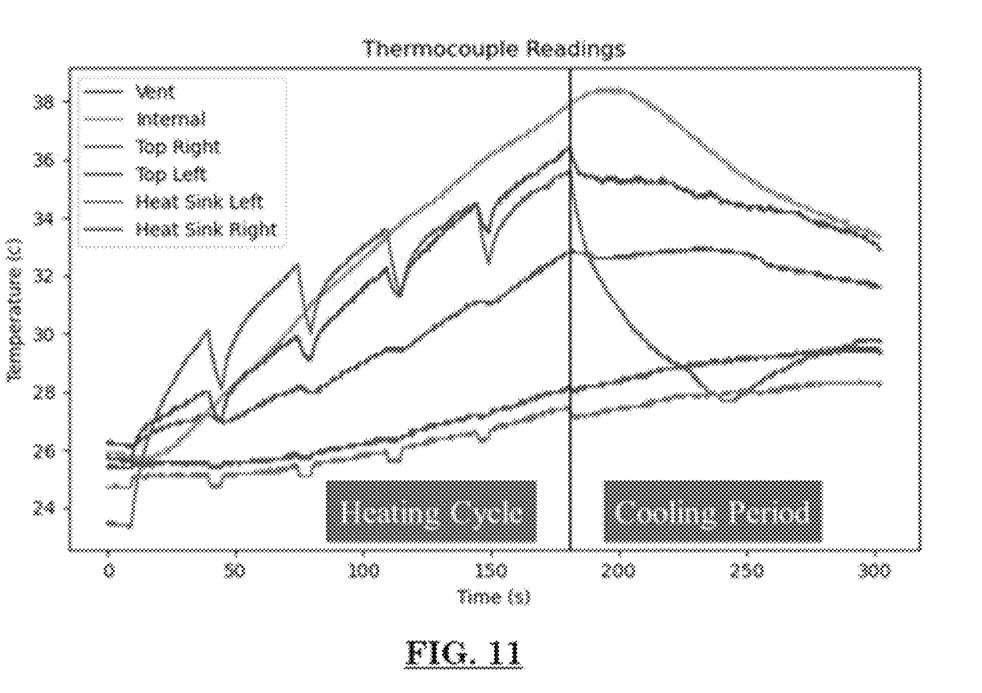
FIG. 11 shows testing results of a scoop of the current disclosure.

Thermocouples were mounted to the scoop to monitor the accumulation and dissipation of heat across the surface. Thermocouples were placed symmetrically across the top of the scoop and the heat sink (Top Left, Top Right, Heat Sink Left, Heat Sink Right), on the vent, and internal to the scoop structure. FIG. 11 shows the results of the testing across each of the thermocouples.

The temperature reached was not commiserate with what would be necessary to process a thermoplastic of aerospace interest like PEEK, but it does give an initial look at the thermal properties of the new scoop.

In this disclosure, a novel AFP scoop design intended for use with materials requiring extremely high processing temperatures was manufactured using L-PFB and tested to examine thermal properties. The scoop was designed to take advantage of the L-PFB process, incorporating a complex heat-sink feature and internal channels for active cooling. Tests were conducted such that the new scoop design was put through a simulated layup, with the heater crystal placed directly on the scoop to represent a worst-case scenario. Heat transfer from the external components of the scoop to internal features and into the coolant vent through convection can be observed.

Various modifications and variations of the described devices and methods of the disclosure will be apparent to those skilled in the art without departing from the scope and spirit of the disclosure. Although the disclosure has been described in connection with specific embodiments, it will be understood that it is capable of further modifications and that the disclosure as claimed should not be unduly limited to such specific embodiments. Indeed, various modifications of the described modes for carrying out the disclosure that are obvious to those skilled in the art are intended to be within the scope of the disclosure. This application is intended to cover any variations, uses, or adaptations of the disclosure following, in general, the principles of the disclosure and including such departures from the present disclosure come within known customary practice within the art to which the disclosure pertains and may be applied to the essential features herein before set forth.

What is claimed is:

1. An improved automated fiber placement scoop comprising;
   an automated fiber placement scoop comprising a scoop body configured to withstand temperatures at or above 500° C.; and
   the scoop body including;
      at least one curve point on a distal end of the scoop configured for engaging a roller;
      at least one fin positioned on the at least one curve point at the distal end of the scoop body, wherein the at least one fin is shaped to cooperate with the at least one curve point engaging the roller;
      an internal cavity disposed within the scoop body further comprising a porous internal lattice support structure shaped to allow gas and/or liquid to flow within an interior of the scoop body and pass through the porous internal lattice support structure;
      a scoop bottom defining a bottom surface feature pattern configured to facilitate removal of the scoop from a build plate; and
      a scoop exterior defining at least one surface topography, adjacent a scoop body proximal end, configured to reduce thermal stress.

2. The improved automated fiber placement scoop of claim 1, further comprising at least one vent opening.

3. The improved automated fiber placement scoop of claim 2, wherein the gas and/or liquid enters the internal cavity via the at least one vent opening.

4. The improved automated fiber placement scoop of claim 3, comprising a second vent opening.

5. The improved automated fiber placement scoop of claim 4, wherein the gas and/or liquid leaves the internal cavity via the second vent opening.

6. The improved automated fiber placement scoop of claim 3, wherein flow of the gas and/or liquid into the internal cavity is adjusted to maintain a prescribed temperature for the scoop.

7. The improved automated fiber placement scoop of claim 1, further comprising wherein the at least one fin comprises a plurality of fins spaced apart and substantially parallel to one another along the distal end of the scoop body.

8. The improved automated fiber placement scoop of claim 7, further comprising spacing the plurality of fins along the distal end of the scoop body so that opposing edges of a tow passing under the scoop are not covered by the plurality of fins or another portion of the scoop.

9. The improved automated fiber placement scoop of claim 1, wherein the scoop is additively manufactured.

10. An improved method for tow placement during an automated fiber placement process comprising;
    incorporating an automated fiber placement scoop into an automated fiber placement device, wherein the scoop is configured to withstand temperatures at or above 500° C.;
    employing the scoop to place at least one tow as part of the automated fiber placement process, wherein the scoop comprises a scoop body;
    wherein the scoop body comprises:
       at least one curve point on a distal end of the scoop configured for engaging a roller of the automated fiber placement process;
       at least one fin positioned on the at least one curve point at the distal end of the scoop body, wherein the at least one fin is shaped to cooperate with the at least one curve point engaging the roller;
       an internal cavity disposed within the scoop body further comprising a porous internal lattice support structure shaped to allow gas and/or liquid to flow within an interior of the scoop body and pass through the porous internal lattice support structure; and
       a scoop exterior defining at least one surface topography, adjacent a scoop body proximal end, configured to reduce thermal stress;
    introducing a gas and/or liquid flow into the internal cavity of the scoop body.

11. The method of claim 10, further comprising wherein the scoop includes at least one vent opening.

12. The method of claim 11, further comprising wherein the gas and/or liquid enters the internal cavity via the at least one vent opening.

13. The method of claim 10, further comprising wherein the scoop includes a second vent opening.

14. The method of claim 13, further comprising influencing the gas and/or liquid to leave the internal cavity via the second vent opening.

15. The method of claim 10, further comprising wherein the at least one fin comprises a plurality of fins spaced apart and substantially parallel to one another along the distal end of the scoop body.

16. The method of claim 15, further comprising spacing the plurality of fins along the distal end of the scoop body so that opposing edges of a tow passing under the scoop are left uncovered by the plurality of fins or another portion of the scoop.

17. The method of claim 10, further comprising adjusting the flow of the gas and/or liquid into the internal cavity to maintain a prescribed temperature for the scoop.

* * * * *